(12) United States Patent
Muralidharan et al.

(10) Patent No.: US 10,977,196 B2
(45) Date of Patent: Apr. 13, 2021

(54) COMMUNICATION INTERFACE CONTROL SYSTEM

(71) Applicant: Smart IOPS, Inc., Milpitas, CA (US)

(72) Inventors: Kirankumar Muralidharan, Bangalore (IN); Sathishkumar Udayanarayanan, Bangalore (IN); Ashutosh Das, Cupertino, CA (US)

(73) Assignee: SMART IOPS, INC., Malpitas, CA (US)

( * ) Notice: Subject to any disclaimer, the term of this patent is extended or adjusted under 35 U.S.C. 154(b) by 0 days.

(21) Appl. No.: 16/545,257

(22) Filed: Aug. 20, 2019

(65) Prior Publication Data

US 2021/0056049 A1  Feb. 25, 2021

(51) Int. Cl.
*G06F 13/16* (2006.01)
*G06F 13/12* (2006.01)
*G06F 13/362* (2006.01)
*G06F 13/42* (2006.01)

(52) U.S. Cl.
CPC .......... *G06F 13/12* (2013.01); *G06F 13/1621* (2013.01); *G06F 13/3625* (2013.01); *G06F 13/4273* (2013.01)

(58) Field of Classification Search
None
See application file for complete search history.

(56) References Cited

U.S. PATENT DOCUMENTS

| | | | | |
|---|---|---|---|---|
| 6,470,391 B2* | 10/2002 | Takamoto | ............. | H04L 1/1809 370/230 |
| 7,433,915 B2* | 10/2008 | Edwards | ................. | H04L 67/16 709/203 |
| 7,921,244 B2* | 4/2011 | Chang | ................. | G06F 13/4295 710/62 |
| 8,315,269 B1* | 11/2012 | Rajamanickam | ... | G06F 13/4027 370/419 |
| 2017/0236566 A1* | 8/2017 | Nukala | ............... | G06F 13/1673 711/105 |

* cited by examiner

*Primary Examiner* — Elias Mamo
(74) *Attorney, Agent, or Firm* — Chip Law Group

(57) ABSTRACT

A system includes a controller for controlling communication between a first device and a second device connected by way of a communication interface. The controller that is associated with the first device is configured to receive a communication request from a processor of the first device for communicating with the second device. Based on the communication request, the controller is further configured to retrieve a set of instructions from an instruction memory that is associated with the first device. Further, the controller is configured to control the communication interface at each cycle of a clock signal by executing each instruction thus controlling the communication between the first and second devices at each cycle of the clock signal.

20 Claims, 11 Drawing Sheets

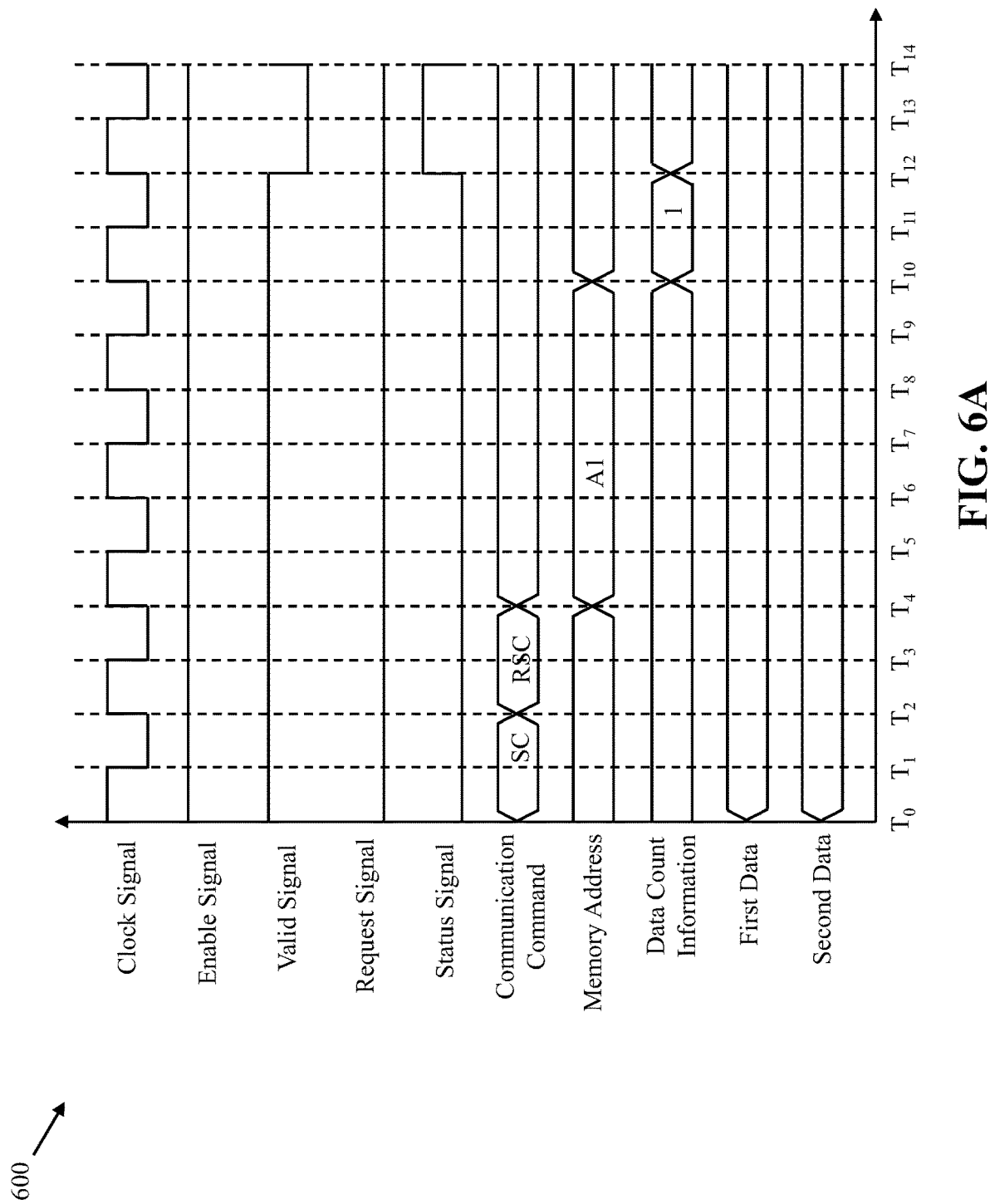

US 10,977,196 B2

COMMUNICATION INTERFACE CONTROL SYSTEM

FIELD OF THE INVENTION

The present invention relates generally to electronic systems, and more particularly, to a system for controlling a communication interface between two or more devices.

BACKGROUND

Electronic devices communicate with each other for exchange of information by way of a communication interface. Such electronic devices include an interface control system to control the communication interface. FIG. 1 illustrates a block diagram of a conventional interface control system 100. The conventional interface control system 100 may be embedded within an electronic device (not shown). The conventional interface control system 100 includes a first device 102 and a second device 104 that communicate with each other by way of a communication interface 106. The first device 102 includes a processor 108, a communication bus 110, and a general-purpose input/output (GPIO) circuit 112 which is connected to the communication interface 106. The GPIO circuit 112 is a dedicated peripheral of the first device 102 that has dedicated GPIO pins (not shown) for communication with the second device 104. The communication interface 106 includes a set of control channels 114a-114n, a data-out bus 116, and a data-in bus 118.

The processor 108 generates a set of control signals to communicate with the second device 104. The processor 108 further transmits, by way of the GPIO circuit 112 and the set of control channels 114a-114n, the set of control signals to the second device 104 for establishing communication with the second device 104. When the communication corresponds to transmission of data by the first device 102, the first device 102 transmits the data by way of the data-out bus 116 to the second device 104. Further, when the communication corresponds to reception of data by the first device 102, the first device 102 receives the data by way of the data-in bus 118 from the second device 104.

As the processor 108 controls the communication interface 106 by way of the GPIO circuit 112, latencies are introduced while performing various high-speed operations by the processor 108. Due to the latencies, a performance of the processor 108 is degraded as the processor 108 requires additional processing cycles for communicating with the second device 104, thereby affecting a data transfer rate associated with the communication interface 106.

Thus, it would be advantageous to have a system that controls the communication interface, reduces the latencies in the communication, and solves the above-mentioned problems of the conventional interface control systems.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

FIGS. 6A and 6B, collectively, represent a timing diagram illustrating reception of data by the first device from the second device in accordance with an exemplary embodiment of the present invention;

DETAILED DESCRIPTION

Figure 1:
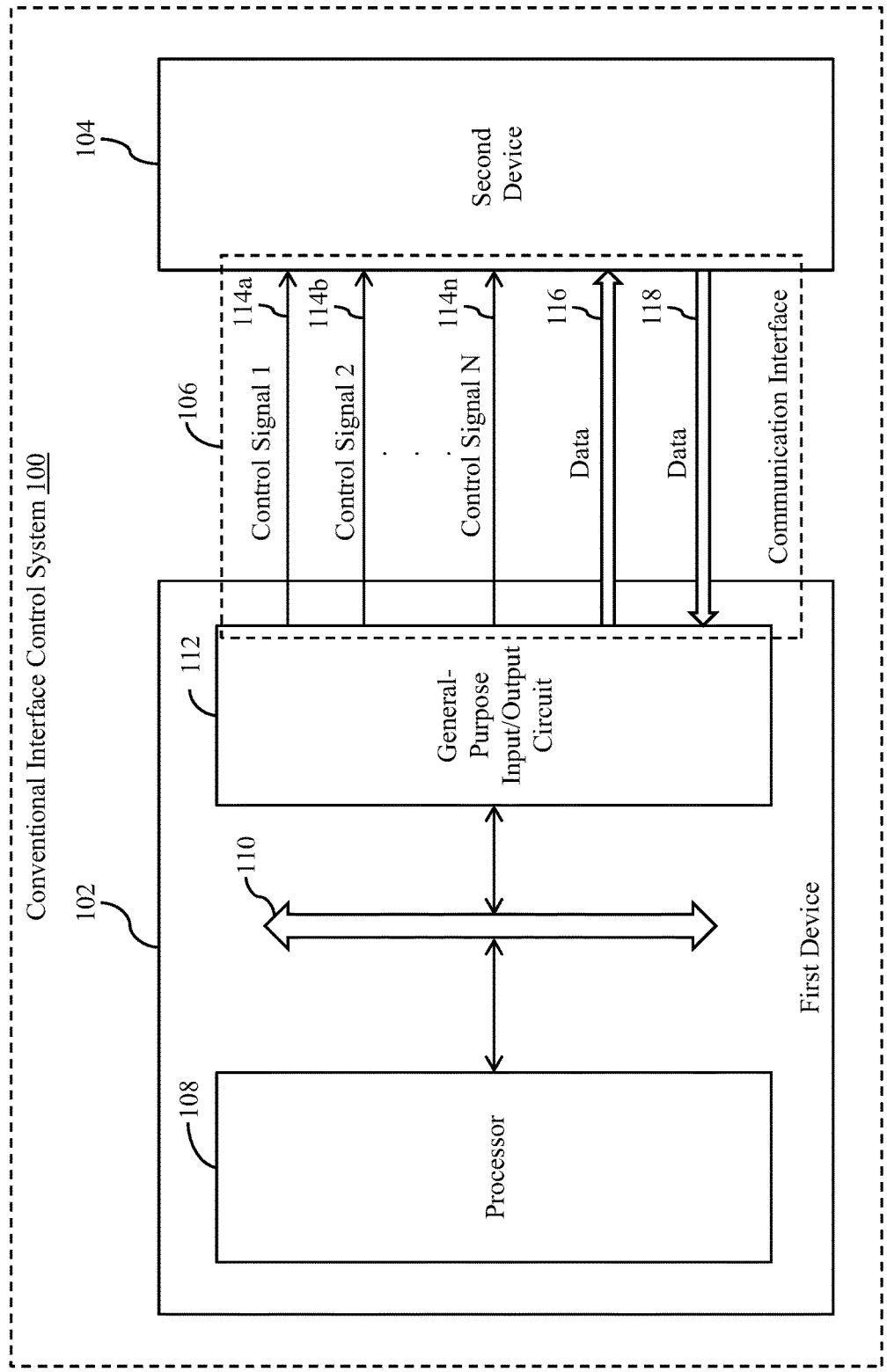
FIG. 1 illustrates a block diagram of a conventional interface control system.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment, the present invention provides a first device for controlling communication with a second device. The first device is connected to the second device by way of a communication interface. The first device includes a processor and a controller. The processor generates a communication request for communicating with the second device. The controller is connected to the processor and is configured to receive the communication request from the processor. Based on the communication request, the controller is further configured to retrieve a set of instructions from an instruction memory associated with the first device. Further, the controller is configured to control the communication interface at each cycle of a clock signal associated with the first device by executing each instruction of the set of instructions. Thus, the controller controls the communication between the first and second devices.

In another embodiment, the present invention provides a method for controlling communication between a first device and a second device that are connected by way of a communication interface. The method includes receiving, by a controller associated with the first device from a processor of the first device, a communication request for communicating with second device. The method further includes retrieving, by the controller based on the communication request, a set of instructions from an instruction memory associated with the first device. The method further includes controlling, by the controller, the communication interface at each cycle of a clock signal associated with the first device by executing the set of instructions, thereby controlling the communication between the first and second devices.

In yet another embodiment, the present invention provides an interface control system that includes a communication interface and first and second devices connected by way of the communication interface. The first device controls communication with the second device. The first device includes a processor and a controller. The processor generates a communication request for communicating with the second device. The controller is connected to the processor and is configured to receive the communication request from the processor. Based on the communication request, the controller is further configured to retrieve a set of instructions from an instruction memory associated with the first device. Further, the controller is configured to control the communication interface at each cycle of a clock signal associated with the first device by executing each instruction of the set of instructions. Thus, the controller controls the communication between the first and second devices.

Various embodiments of the present invention provide a system for controlling communication between a first device and a second device that are connected by way of a communication interface. A controller that is associated with the first device is configured to receive a communication request from a processor of the first device for communicating with the second device. The communication request is generated based on a communication protocol associated with the communication interface. Based on the communication request, the controller retrieves a set of instructions and generates a set of control signals at each cycle of a clock signal by executing each instruction. The controller further transmits the set of control signals to the second device by way of the communication interface, thereby controlling the communication interface. Thus, the controller controls communication with the second device.

As the controller controls the communication interface, a need for the processor to control the communication interface is eliminated. Further, a number of processing cycles required by the processor for communicating with the second device reduces as the controller generates the set of control signals. Hence, a performance of the processor improves as compared to the performance of processors of conventional interface control systems. As a result, a data transfer rate associated with the communication interface increases as compared to data transfer rates associated with communication interfaces of the conventional interface control systems. Further, the controller transmits the set of control signals at each cycle of the clock signal. Thus, the controller controls the communication interface at each cycle of the clock signal.

Figure 2:
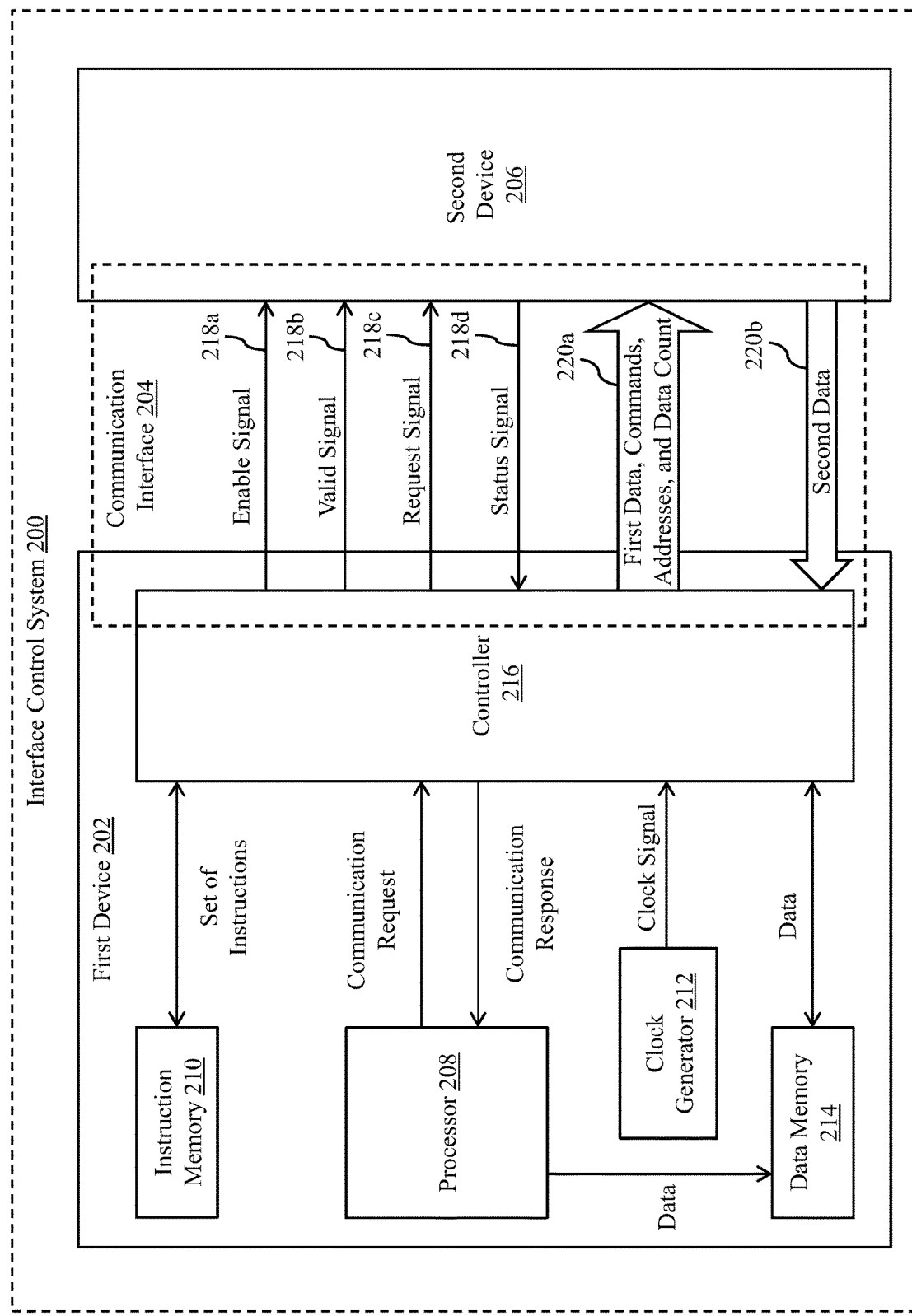
FIG. 2 illustrates a block diagram of an interface control system in accordance with an embodiment of the present invention.

FIG. 2 illustrates a block diagram of an interface control system 200 in accordance with an embodiment of the present invention. The interface control system 200 may be embedded within an electronic device (not shown) such as a computer, a cell phone, a digital camera, a phablet, a laptop, or the like. The interface control system 200 includes a first device 202, a communication interface 204, and a second device 206. The first device 202 and the second device 206 communicate with each other by way of the communication interface 204.

The first device 202 is a host device that initiates communication with the second device 206 by way of the communication interface 204. In an embodiment, the first device 202 is a master device and the second device 206 is a slave device. The first device 202 includes a processor 208, an instruction memory 210, a clock generator 212, a data memory 214, and a controller 216.

The processor 208 generates a communication request for establishing communication with the second device 206. The communication request is generated based on a communication protocol associated with the communication interface 204. The processor 208 transmits the communication request to the controller 216. In response to the communication request, the processor 208 receives a communication response from the controller 216. Examples of the processor 208 include, but are not limited to, a reduced instruction set computing (RISC) processor, a complex instruction set computing (CISC) processor, and the like.

The instruction memory 210 stores a first set of instructions that are executable by the controller 216. The first set of instructions may include at least drive, freeze, capture, wait, flow control, arithmetic, and logic instructions to perform an associated operation. The drive instruction is associated with transmission of data (such as first data) and a set of control signals from the first device 202 to the second device 206. For the sake of foregoing discussion and without deviating from the scope of the invention, the set of control signals include enable, valid, and request signals. The enable signal indicates that the communication interface 204 is enabled for the communication. The valid signal indicates that data (such as the first data) transmitted from the first device 202 to the second device 206 is valid data. The request signal indicates a request by the first device 202 for receiving data (such as second data) from the second device 206.

The freeze instruction is associated with retaining logic states of the set of control signals for continual transmission or reception of the data. The capture instruction is associated with the reception of the second data by the first device 202 from the second device 206. The wait instruction is associated with a delay in the transmission of the first data or the set of control signals from the first device 202 to the second device 206. The flow control instruction is associated with controlling a flow of execution of the instructions. The arithmetic instruction is associated with an arithmetic operation such as addition, subtraction, multiplication, division, or the like. The logic instruction is associated with a bitwise operation such as AND, OR, NOT, or the like.

Each instruction may include an opcode and a set of operands. The opcode specifies an operation to be performed by the controller 216 which is indicated by the corresponding instruction. Examples of opcodes include DRIVE, FREEZE, CAPTURE, WAIT, or the like. The set of operands may specify data stored in an internal register (not shown) of the controller 216, data stored at a memory location of the data memory 214, or data stored in the internal memory (not shown) of the controller 216, on which the operation specified by the opcode is performed. In an example, the drive instruction may include 'DRIVE' as the opcode which indicates transmitting (i.e., driving) data or the set of control signals to the second device 206. The drive instruction may further include first and second operands. The first operand indicates data that is transmitted to the second device 206 by way of the communication interface 204. The second operand indicates a size of data for transmitting to the second device 206. In an example, the first and second operands are 'first data' and 'N', respectively. The controller 216 thus retrieves N bytes of the first data from the data memory 214 and transmits the N bytes of the first data to the second device 206 by way of the communication interface 204. Examples of the instruction memory 210 include, but are not limited to, one or more volatile memories, one or more non-volatile memories, or a combination of volatile and non-volatile memories.

The clock generator 212 generates a clock signal for controlling an operation of the controller 216. The controller 216 controls the communication between the first and second devices 202 and 206 at each cycle of the clock signal.

Although the present invention illustrates that the clock generator 212 is internal to the first device 202, it will be apparent to a person skilled in the art that the scope of the present invention is not limited to it. In various other embodiments, the clock generator 212 may be external to the first device 202, without deviating from the scope of the present invention.

The data memory 214 stores data in bytes or words. The data memory 214 is connected to the controller 216 for receiving or providing the data. In an example, data (such as the first data) is retrieved by the controller 216 from the data memory 214, and transmitted to the second device 206. In another example, data (such as the second data) is received by the controller 216 from the second device 206, and stored in the data memory 214. In an embodiment, the data memory 214 is connected to the processor 208 for receiving data, such as the first data. In another embodiment, the data memory 214 is connected to a functional circuitry (not shown) for receiving data, such as the first data. The functional circuitry may be internal or external to the first device 202. In an example, the data memory 214 is a volatile memory.

The controller 216 is connected to the processor 208, the instruction memory 210, and the clock generator 212 for receiving the communication request, a set of instructions, and the clock signal, respectively. Based on the communication request, the controller 216 retrieves and executes a second set of instructions from the first set. In an example, the controller 216 executes at least one of the drive, freeze, capture, wait, flow control, arithmetic, or logic instructions. In another example, the controller 216 executes the second set of instructions to perform a subroutine which is defined by the communication protocol. In yet another example, the controller 216 executes the second set of instructions to perform multiple subroutines that are defined by the communication protocol. When the second set of instructions is executed to perform a single subroutine, the controller 216 executes each instruction of the second set in a pre-determined sequence to control the communication interface 204 at each cycle of the clock signal. When the second set of instructions is executed to perform multiple subroutines, the controller 216 executes each subroutine in a pre-determined sequence. Further, based on the execution of the second set of instructions, the controller 216 generates the set of control signals. The set of control signals are transmitted to the second device 206 by way of the communication interface 204 to control the communication between the first device 202 and the second device 206.

The controller 216 may receive a status signal from the second device 206 by way of the communication interface 204. The status signal indicates whether the second device 206 is ready for the communication. In an example, the execution of the wait instruction is associated with transition of the status signal from one logic state to another logic state. In other words, when the wait instruction is executed, the controller 216 waits for the status signal to transition from one logic state to another logic state, to transmit the first data or the set of control signals to the second device 206.

The controller 216 may further generate communication commands such as a start command, a read status command, a read data command, a write data command, and an end command. The start command initiates the communication between the first device 202 and the second device 206. The read status command initiates the reception of the status signal by the first device 202 from the second device 206. The read data command initiates the reception of data (such as the second data) by the first device 202 from the second device 206. The write data command initiates the transmission of data (such as the first data) by the first device 202 to the second device 206. The end command indicates the completion of the communication between the first device 202 and the second device 206. The controller 216 transmits the communication commands to the second device 206 by way of the communication interface 204. In addition to the transmission of the communication commands, the controller 216 also transmits memory addresses associated with the second device 206 and data count information, to the second device 206 by way of the communication interface 204. The data count information indicates a number of cycles of the clock signal for which the set of control signals and the first data are to be transmitted to the second device 206, or the status signal and the second data are to be received from the second device 206.

The first device 202 and the second device 206 communicate with each other to transmit data, receive data, or the like, that is indicated by the communication request. In an example, when the communication between the first and second devices 202 and 206 corresponds to the transmission of data (such as the first data), the controller 216 retrieves at least the drive instruction. Further, the controller 216 executes the drive instruction to generate the set of control signals such as the enable and valid signals at logic high state and the request signal at logic low state. The controller 216 transmits the set of control signals to the second device 206 by way of the communication interface 204. The controller 216 further retrieves the first data for transmission. In an embodiment, the controller 216 retrieves the first data from the data memory 214. In another embodiment, the controller 216 retrieves the first data from the internal register of the controller 216. On retrieving the first data, the controller 216 controls the transmission of the first data from the first device 202 to the second device 206. In a scenario, the controller 216 executes a drive instruction with opcode as 'DRIVE' and operand as 'first data' to retrieve the first data stored in the internal register or the data memory 214 and transmits the first data to the second device 206.

In another example, when the communication between the first device 202 and the second device 206 corresponds to the reception of the data, the controller 216 retrieves at least the drive and capture instructions. Based on the execution of the drive instruction, the controller 216 generates the enable and request signals at logic high state and the valid signal at logic low state. The controller 216 further transmits the enable, request, and valid signals to the second device 206. On receiving the set of control signals, the second device 206 provides the second data on the second data bus 220b. Further, the controller 216 executes the capture instruction for receiving the second data from the second device 206 by way of the communication interface 204. The controller 216 thus controls the reception of the second data. In an embodiment, the controller 216 stores the received second data in the data memory 214. In another embodiment, the controller 216 stores the received second data in the internal register. In an example, the controller 216 executes the capture instruction with opcode as 'CAPTURE' and operand as 'second data' to receive the second data from the second device 206 and store the second data in the internal register or the data memory 214. The controller 216 may further execute arithmetic or logic instructions to perform arithmetic or logical operations on the second data.

The controller 216 further provides a status of the communication between the first device 202 and the second device 206 by generating a communication response which is based on the communication request. The status of the communication may be one of "complete", "ongoing", or the like. The status "complete" indicates that the communication between the first device 202 and the second device 206 is complete. When the communication request is indicative of the transmission of the first data, the communication response indicates the status as "ongoing" when the communication between the first device 202 and the second device 206 is in progress. Further, the communication response indicates the status as "complete" when the first data is transmitted to the second device 206. Similarly, when the communication request is indicative of the reception of the second data, the communication response indicates the status as "ongoing" when the second data is being received by the first device 202. Further, the communication response indicates the status as "complete" when the second data is received by the first device 202.

The communication interface 204 includes first through fourth control channels 218a-218d, a first data bus 220a, and a second data bus 220b. The first through third control channels 218a-218c are unidirectional output channels and the fourth control channel 218d is a unidirectional input channel. The first data bus 220a is a unidirectional output data bus and the second data bus 220b is a unidirectional input data bus. The controller 216 transmits the enable, valid, and request signals by way of the first through third control channels 218a-218c, respectively, and the first data, the communication commands, memory addresses, and the data count information by way of the first data bus 220a. The first data, the communication commands, memory addresses, and the data count information are illustrated in FIG. 2 as "First Data", "Commands", "Addresses", and "Data Count", respectively. Further, the controller 216 receives the status signal and the second data by way of the fourth control channel 218d and the second data bus 220b, respectively.

Although the present invention describes the use of the first through third control channels 218a-218c for transmission of the set of control signals, and the fourth control channel 218d for reception of the status signal, it will be apparent to a person having ordinary skill in the art that the scope of the present invention is not limited to it. In an alternate embodiment of the present invention, one of the first through third control channels 218a-218c may be bidirectional channels for transmitting and receiving a control signal (such as the enable, valid, or request signal) and the status signal, respectively. Similarly, although the present invention describes the use of the first and second data buses 220a and 220b for transmission and reception of the first and second data, respectively, it will be apparent to a person having ordinary skill in the art that the scope of the present invention is not limited to it. In an alternate embodiment of the present invention, one of the first or second data buses 220a or 220b may be bidirectional data buses for transmitting and receiving the first and second data.

The second device 206 may be similar to the first device 202 or may include a hardware-based interface control circuit (not shown) for receiving the set of control signals from the first device 202. The second device 206 generates and provides the status signal to the first device 202 by way of the communication interface 204. Further, the second device 206 provides data (such as the second data) to the first device 202 by way of the communication interface 204. In an example, the second device 206 is a memory device such as a NAND Flash device.

The first device 202 may communicate with the second device 206 based on various communication protocols associated with the communication interface 204, such as the open NAND flash interface (ONFI) protocol. Based on the communication protocol associated with the communication interface 204, the processor 208 generates the communication request and the controller 216 retrieves the second set of instructions from the instruction memory 210. In an example, for initiating the communication, the controller 216 transmits the start command to the second device 206 by way of the first data bus 220a. Further, the controller 216 transmits a first memory address associated with the second device 206 by way of the first data bus 220a, over three cycles of the clock signal. When the communication corresponds to the transmission or reception of data, the controller 216 further transmits the data count information (such as 'N') by way of the first data bus 220a. Further, the controller 216 transmits the set of control signals and the first data to the second device 206 or receives the status signal and the second data for N cycles of the clock signal. The controller 216 further transmits the end command to the second device 206 by way of the first data bus 220a.

The controller 216 may perform multiple subroutines by executing the second set of instructions to complete various operations. For example, when the communication corresponds to the reception of data by the first device 202 from the second device 206, the data is received by performing a first subroutine. The first subroutine corresponds to determining whether data is available with the second device 206 and receiving the second data when the second data is available. To initiate the communication, the controller 216 transmits the start command to the second device 206 by way of the first data bus 220a. Further, the controller 216 transmits the read status command to the second device 206 by way of the first data bus 220a. The controller 216 further transmits, by way of the first data bus 220a, the first memory address over three cycles of the clock signal. For receiving the status signal, the controller 216 transmits the data count information as '1' by way of the first data bus 220a. The controller 216 receives the status signal from the second device 206 by way of the fourth control channel 218d. If the status signal indicates that the second device 206 is ready for the communication, the controller 216 transmits the read data command to the second device 206 by way of the first data bus 220a. The controller 216 further transmits a second memory address associated with the second device 206 from which the second data is to be read. The second memory address is transmitted over three cycles of the clock signal. For receiving N bytes of the second data, the controller 216 transmits data count information as 'N' by way of the first data bus 220a. The controller 216 receives N bytes of the second data from the second device 206 by way of the second data bus 220b. Further, the controller 216 generates the set of control signals at each cycle of the clock signal based on the execution of the first subroutine, and transmits the set of control signals to the second device 206 by way of the first through third control channels 218a-218c. The controller 216 further transmits the end command to the second device 206 by way of the first data bus 220a.

When the communication corresponds to the transmission of data by the first device 202 to the second device 206, the data is transmitted by performing a second subroutine. To initiate the communication, the controller 216 transmits the start command to the second device 206 by way of the first data bus 220a. Further, the controller 216 transmits the write data command to the second device 206 by way of the first data bus 220a. The controller 216 further transmits a third memory address associated with the second device 206 at which the first data is to be written. The third memory address is transmitted over three cycles of the clock signal.

For transmitting N bytes of the first data, the controller 216 transmits the data count information as 'N' by way of the first data bus 220*a*. The controller 216 transmits N bytes of the first data to the second device 206 by way of the first data bus 220*a*. Further, the controller 216 generates the set of control signals at each cycle of the clock signal based on the execution of the second subroutine, and transmits the set of control signals to the second device 206 by way of the first through third control channels 218*a*-218*c*. The controller 216 further transmits the end command to the second device 206 by way of the first data bus 220*a*.

Figure 3:
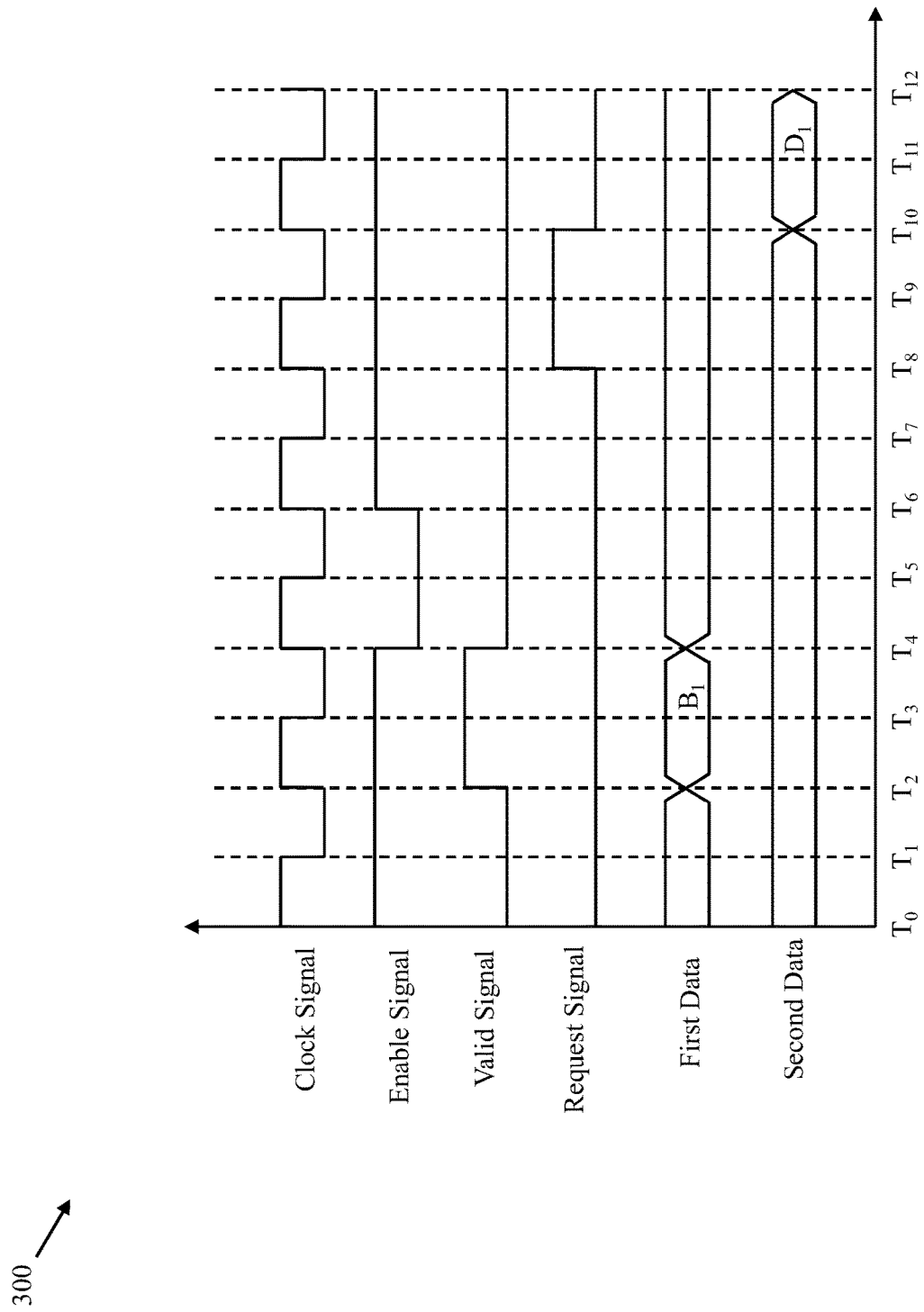
FIG. 3 is a timing diagram illustrating communication between first and second devices of FIG. 2 in accordance with an embodiment of the present invention.

FIG. 3 is a timing diagram 300 illustrating the communication between the first and second devices 202 and 206 in accordance with an embodiment of the present invention. The communication between the first and second devices 202 and 206 corresponds to the transmission and reception of the first and second data, respectively.

Time period $T_0$-$T_2$ indicates a first cycle of the clock signal. In the first cycle, the enable signal is at logic high state and the valid and request signals are at logic low state. Thus, the communication interface 204 is enabled for communication.

At time instance $T_2$, the valid signal transitions from logic low state to logic high state. During time period $T_2$-$T_4$, i.e., during a second cycle of the clock signal, the enable and valid signals remain at logic high state and the request signal remains at logic low state. The controller 216 thus executes a drive instruction which includes the opcode as 'DRIVE' and the operand as 'the first data' to transmit the first byte $B_1$ of the first data to the second device 206 by way of the first data bus 220*a*.

At time instance $T_4$, the enable and valid signals transition from logic high state to logic low state. During time period $T_4$-$T_6$, i.e., during a third cycle of the clock signal, the enable, valid, and request signals remain at logic low state. Thus, the communication interface 204 is disabled for communication.

At time instance $T_6$, the enable signal transitions from logic low state to logic high state. During time period $T_6$-$T_8$, i.e., during a fourth cycle of the clock signal, the enable signal remains at logic high state and the valid and request signals remain at logic low state. Thus, the communication interface 204 is enabled for communication.

At time instance $T_8$, the request signal transitions from logic low state to logic high state. During time period $T_8$-$T_{10}$, i.e., during a fifth cycle of the clock signal, the enable and request signals remain at logic high state and the valid signal remains at logic low state. Thus, the first device 202 transmits a request for receiving the data from the second device 206.

At time instance $T_{10}$, the request signal transitions from logic high state to logic low state. During time period $T_{10}$-$T_{12}$, i.e., during a sixth cycle of the clock signal, the enable signal remains at logic high state and the valid and request signals remain at logic low state. The controller 216 thus executes the capture instruction which includes the opcode as 'CAPTURE' and the operand as 'second data' to receive the first byte $D_1$ of the second data from the second device 206 by way of the second data bus 220*b*.

It will be understood by a person skilled in the art that the remaining bytes of the first and second data are transmitted or received in a manner similar to the transmission and reception of the first byte $B_1$ of first data and the first byte $D_1$ of second data, respectively.

Figure 4:
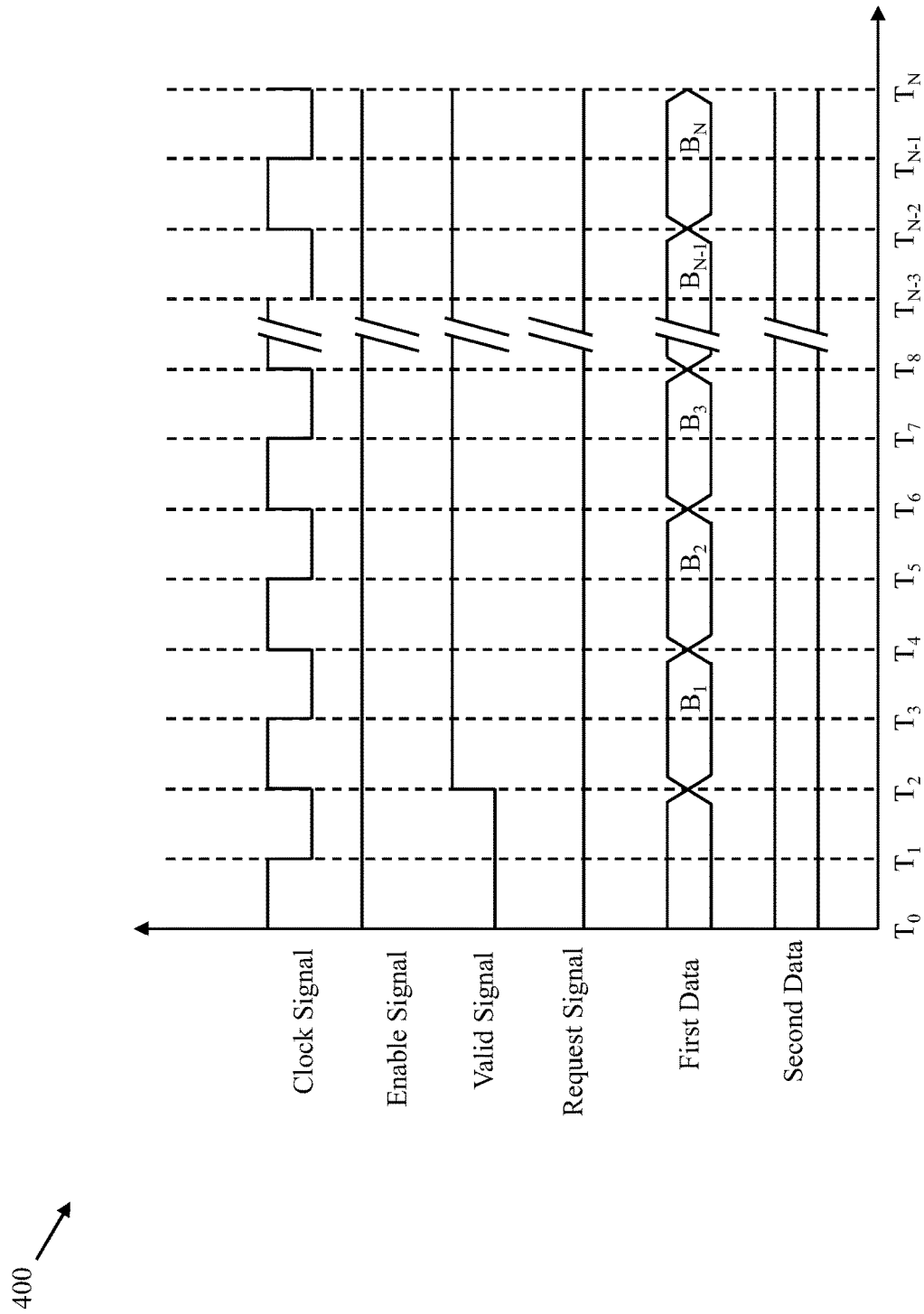
FIG. 4 is a timing diagram illustrating communication between the first and second devices in accordance with another embodiment of the present invention.

FIG. 4 is a timing diagram 400 illustrating communication between the first and second devices 202 and 206 in accordance with another embodiment of the present invention. The communication between the first and second devices 202 and 206 corresponds to the transmission of the first data in burst, i.e., the transmission of the first data for multiple cycles of the clock signal.

During time period $T_0$-$T_2$, i.e., during a first cycle of the clock signal, the enable signal is at logic high state and the valid and request control signals are at logic low state. Thus, the communication interface 204 is enabled for communication.

At time instance $T_2$, the valid control signal transitions from logic low state to logic high state. During time period $T_2$-$T_4$, i.e., during a second cycle of the clock signal, the enable and valid signals remain at logic high state and the request signal remains at logic low state. Thus, the first byte $B_1$ of the first data is transmitted by the first device 202 to the second device 206 by way of the first data bus 220*a*.

During time period $T_4$-$T_N$, i.e., during third through Nth cycles of the clock signal, the enable and valid signals remain at logic high state and the request signal remains at logic low state. Thus, second through Nth bytes $B_2$-$B_N$ of the first data are transmitted by the first device 202 to the second device 206 by way of the first data bus 220*a*. During time period $T_2$-$T_N$, the controller 216 executes the drive instruction that includes the opcode as 'DRIVE' and the first and second operands as 'first data' and 'N', respectively, to transmit N bytes of the first data to the second device 206. The controller 216 further executes a freeze instruction to retain logic states of the set of control signals for continual transmission of the first data.

Figure 5:
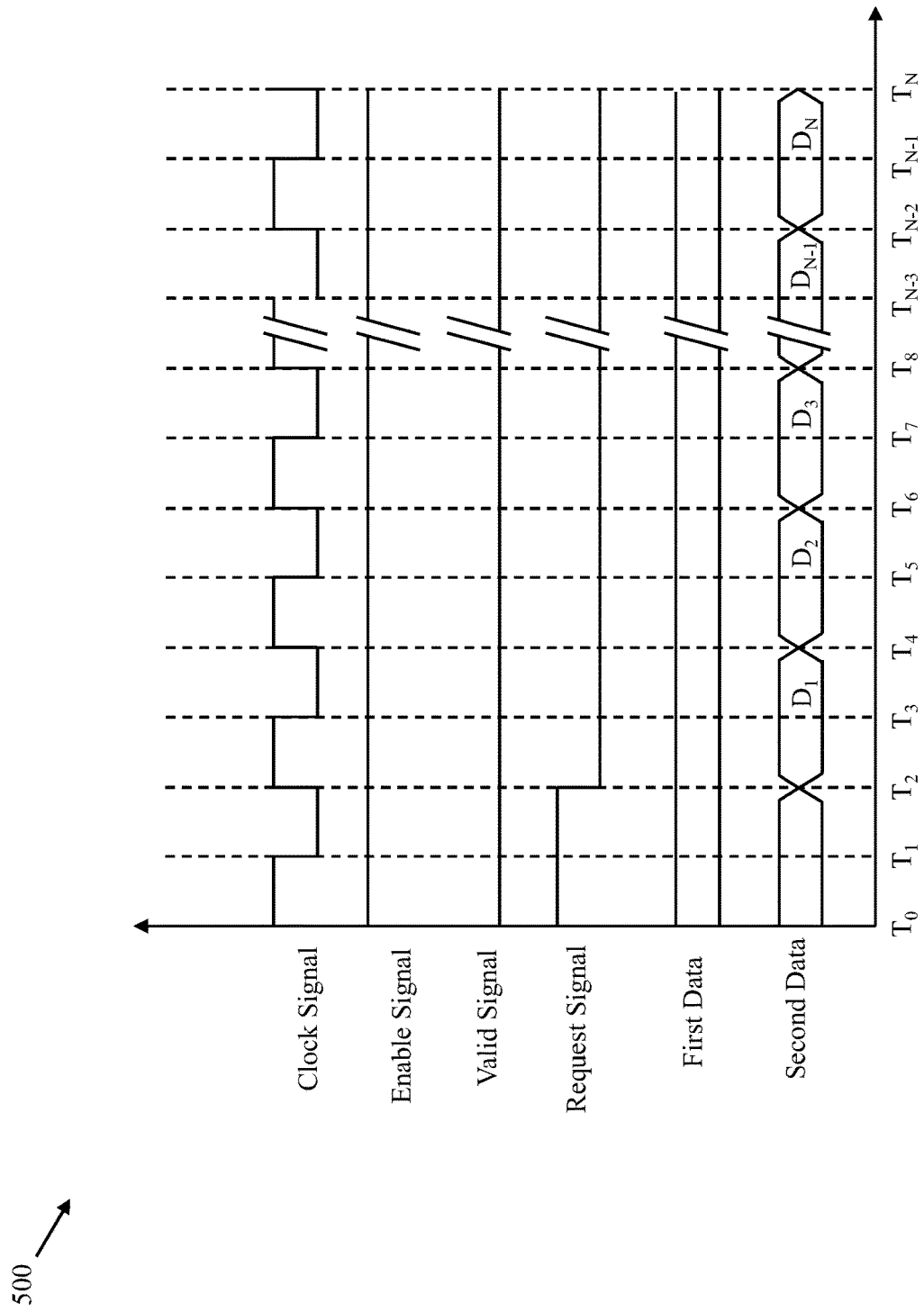
FIG. 5 is a timing diagram illustrating communication between the first and second devices in accordance with yet another embodiment of the present invention.

FIG. 5 is a timing diagram 500 illustrating communication between the first device 202 and the second device 206 in accordance with yet another embodiment of the present invention. The communication between the first device 202 and the second device 206 corresponds to the reception of the second data in burst, i.e., the reception of the second data for multiple cycles of the clock signal.

During time period $T_0$-$T_2$, i.e., during a first cycle of the clock signal, the enable and request signals are at logic high state and the valid signal is at logic low state. Thus, the communication interface 204 is enabled for communication. The first device 202 transmits a data input request to the second device 206.

At time instance $T_2$, the request signal transitions from logic high state to logic low state. During time period $T_2$-$T_4$, i.e., during a second cycle of the clock signal, the enable signal remains at logic high state and the valid and request signals remain at logic low state. Thus, the first byte $D_1$ of the second data is transmitted by the second device 206 to the first device 202 by way of the second data bus 220*b*, i.e., the first device 202 receives the first byte $D_1$ of the second data from the second device 206.

During time period $T_4$-$T_N$, i.e., during second through Nth cycles of the clock signal, the enable signal remains at logic high state and the valid and request signals remain at logic low state. Thus, second through Nth bytes $D_2$-$D_N$ of the second data are transmitted by the second device 206 by way of the second data bus 220*b*, i.e., the first device 202 receives the second through Nth bytes $D_2$-$D_N$ of the second data from the second device 206. During time period $T_2$-$T_N$, the controller 216 executes a capture instruction that includes an opcode as 'CAPTURE' and the first and second operands as 'second data' and 'N', respectively, to receive N bytes of the second data from the second device 206. The controller 216 further executes a freeze instruction to retain logic states of the set of control signals for continual reception of the first data.

Figure 6B:
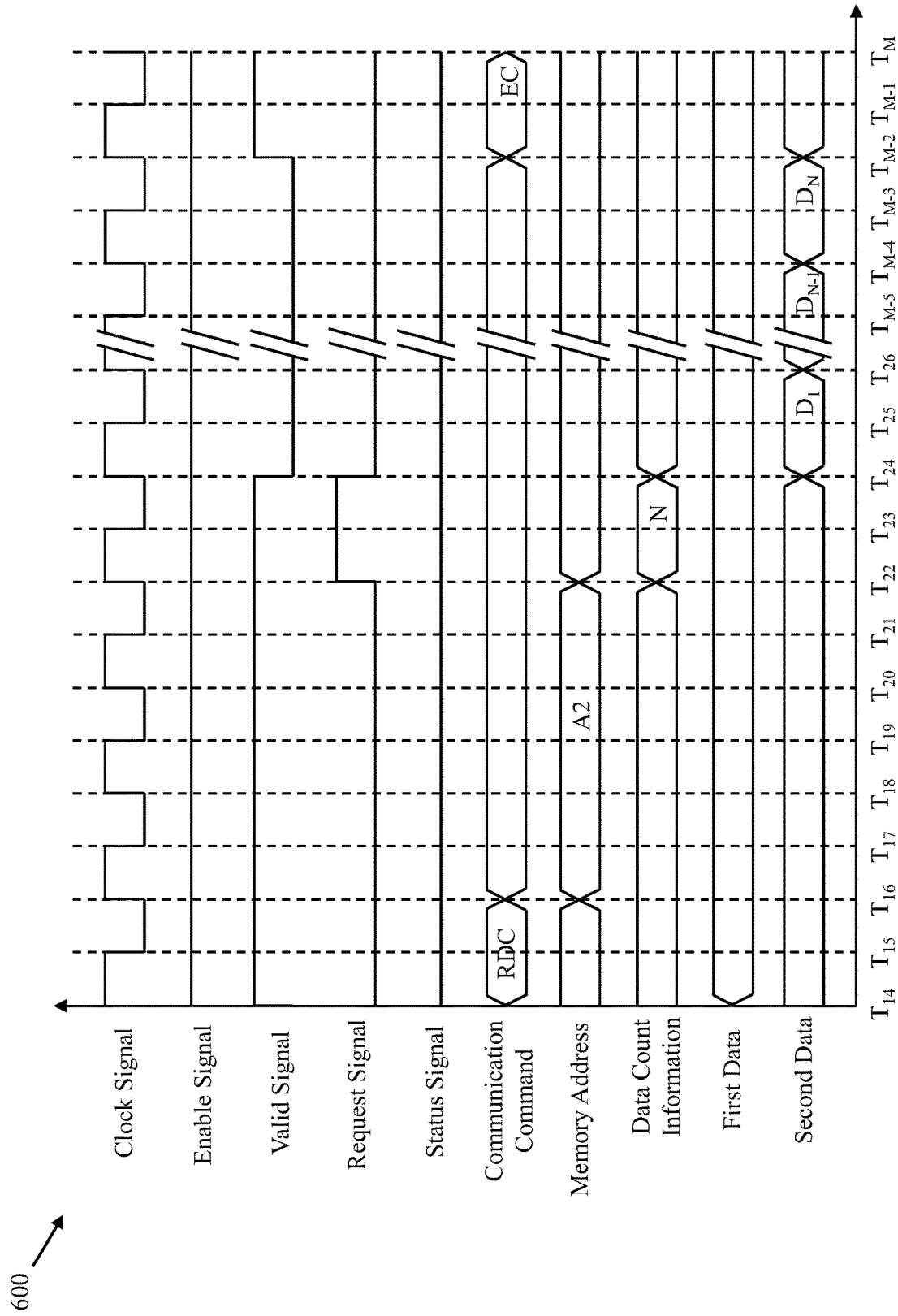

FIGS. 6A and 6B, collectively, represent a timing diagram 600 illustrating the reception of data by the first device 202 from the second device 206 in accordance with an exemplary embodiment of the present invention.

During time period $T_0$-$T_2$, the enable and valid signals are at logic high state, and the request and status signals are at logic low state. Thus, the communication interface 204 is enabled for communication. The controller 216 transmits the start command (illustrated in FIG. 6A as "SC") to the second device 206 by way of the first data bus 220a to initiate the communication.

During time period $T_2$-$T_4$, the enable and valid signals remain at logic high state, and the request and status signals remain at logic low state. The controller 216 transmits the read status command (illustrated in FIG. 6A as "RSC") to the second device 206 by way of the first data bus 220a.

During time period $T_4$-$T_{10}$, the enable and valid signals remain at logic high state, and the request and status signals remain at logic low state. The controller 216 transmits the first memory address (illustrated in FIG. 6A as "A1") to the second device 206 by way of the first data bus 220a, over three cycles of the clock signal.

During time period $T_{10}$-$T_{12}$, the enable and valid signals remain at logic high state, and the request and status signals remain at logic low state. The controller 216 transmits the data count information as '1' to the second device 206 by way of the first data bus 220a to initiate the reception of the status signal from the second device 206 for one cycle of the clock signal.

At time instance $T_{12}$, the status signal transitions from logic low state to logic high state, and the valid signal transitions from logic high state to logic low state. During time period $T_{12}$-$T_{14}$, the enable and status signals remain at logic high state, and the valid and request signals remains at logic low state. Thus, the second device 206 is ready for the communication.

At time instance $T_{14}$, the status signal transitions from logic high state to logic low state, and the valid signal transitions from logic low state to logic high state. During time period $T_{14}$-$T_{16}$, the enable and valid signals remain at logic high state, and the request and status signals remain at logic low state. The controller 216 transmits the read data command (illustrated in FIG. 6B as "RDC") to the second device 206 by way of the first data bus 220a to initiate the reception of the second data from the second device 206.

During time period $T_{16}$-$T_{22}$, the enable and valid signals remain at logic high state, and the request and status signals remain at logic low state. The controller 216 transmits the second memory address (illustrated in FIG. 6B as "A2") to the second device 206 by way of the first data bus 220a, over three cycles of the clock signal, to access a memory location of the second data in the second device 206.

At time instance $T_{22}$, the request signal transitions from logic low state to logic high state. During time period $T_{22}$-$T_{24}$, the enable, valid, and request signals remain at logic high state, and the status signal remains at logic low state. For initiating the reception of N bytes of the second data from the second device 206 for N cycles of the clock signal, the controller 216 transmits the data count information as 'N' to the second device 206 by way of the first data bus 220a.

At time instance $T_{24}$, the valid and request signals transition from logic high state to logic low state. During time period $T_{24}$-$T_{26}$, the enable signal remains at logic high state, and the valid, request, and status signals remain at logic low state. The first byte $D_1$ of the second data is transmitted by the second device 206 to the first device 202 by way of the second data bus 220b, i.e., the first device 202 receives the first byte $D_1$ of the second data from the second device 206.

During time period $T_{26}$-$T_{M-2}$, the enable signal remains at logic high state, and the valid, request, and status signals remain at logic low state. The second through Nth bytes $D_2$-$D_N$ of the second data are transmitted by the second device 206 by way of the second data bus 220b, i.e., the first device 202 receives the second through Nth bytes $D_2$-$D_N$ of the second data from the second device 206.

At time instance $T_{M-2}$, the valid signal transitions from logic low state to logic high state. During time period $T_{M-2}$-$T_M$, the enable and valid signals remain at logic high state, and the request and status signals remain at logic low state. The controller 216 transmits the end command (illustrated in FIG. 6B as "EC") to the second device 206 by way of the first data bus 220a to complete the communication.

Figure 7:
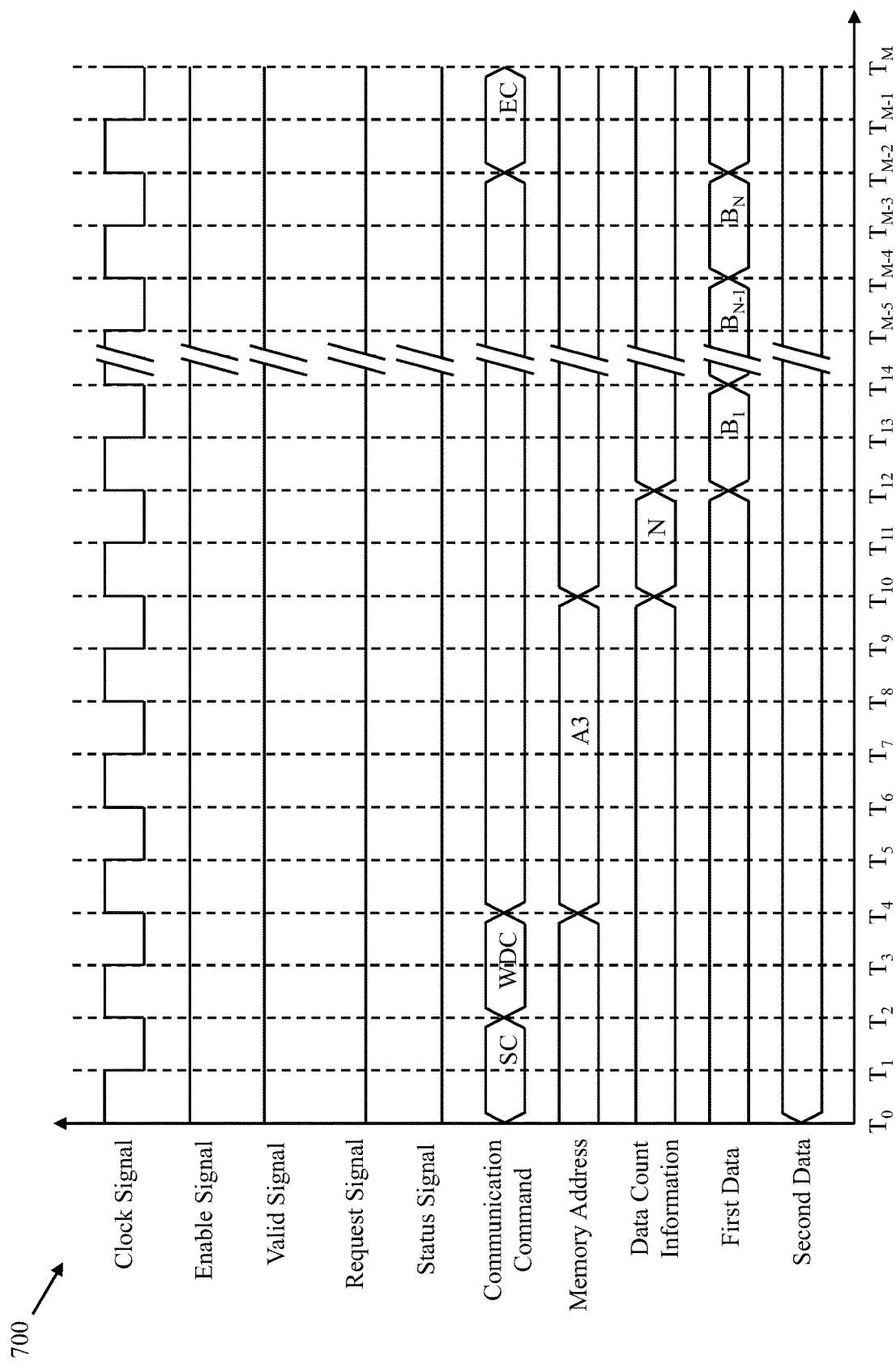
FIG. 7 is a timing diagram illustrating transmission of data by the first device to the second device in accordance with an exemplary embodiment of the present invention.

FIG. 7 is a timing diagram 700 illustrating the transmission of data by the first device 202 to the second device 206 in accordance with an exemplary embodiment of the present invention.

During time period $T_0$-$T_2$, the enable and valid signals are at logic high state, and the request and status signals are at logic low state. Thus, the communication interface 204 is enabled for communication. The controller 216 transmits the start command (illustrated in FIG. 7 as "SC") to the second device 206 by way of the first data bus 220a to initiate the communication.

During time period $T_2$-$T_4$, the enable and valid signals remain at logic high state, and the request and status signals remain at logic low state. To initiate the transmission of the first data to the second device 206, the controller 216 transmits the write data command (illustrated in FIG. 7 as "WDC") to the second device 206 by way of the first data bus 220a.

During time period $T_4$-$T_{10}$, the enable and valid signals remain at logic high state, and the request and status signals remain at logic low state. The controller 216 transmits the third memory address (illustrated in FIG. 7 as "A3") to the second device 206 by way of the first data bus 220a, over three cycles of the clock signal, to access a memory location at which the first data is to be written in the second device 206.

During time period $T_{10}$-$T_{12}$, the enable and valid signals remain at logic high state, and the request and status signals remain at logic low state. For initiating the transmission of N bytes of the second data to the second device 206 for N cycles of the clock signal, the controller 216 transmits the data count information as 'N' to the second device 206 by way of the first data bus 220a.

During time period $T_{12}$-$T_{14}$, the enable and valid signals remain at logic high state, and the request and status signals remain at logic low state. The first byte $B_1$ of the first data is transmitted by the first device 202 to the second device 206 by way of the first data bus 220a.

During time period $T_{14}$-$T_{M-2}$, the enable and valid signals remain at logic high state, and the request and status signals remain at logic low state. The second through Nth bytes $B_2$-$B_N$ of the first data are transmitted by the first device 202 to the second device 206 by way of the first data bus 220a.

During time period $T_{M-2}$-$T_M$, the enable and valid signals remain at logic high state, and the request and status signals remain at logic low state. The controller 216 transmits the end command (illustrated in FIG. 7 as "EC") to the second device 206 by way of the first data bus 220a to complete the communication.

Figure 8A:
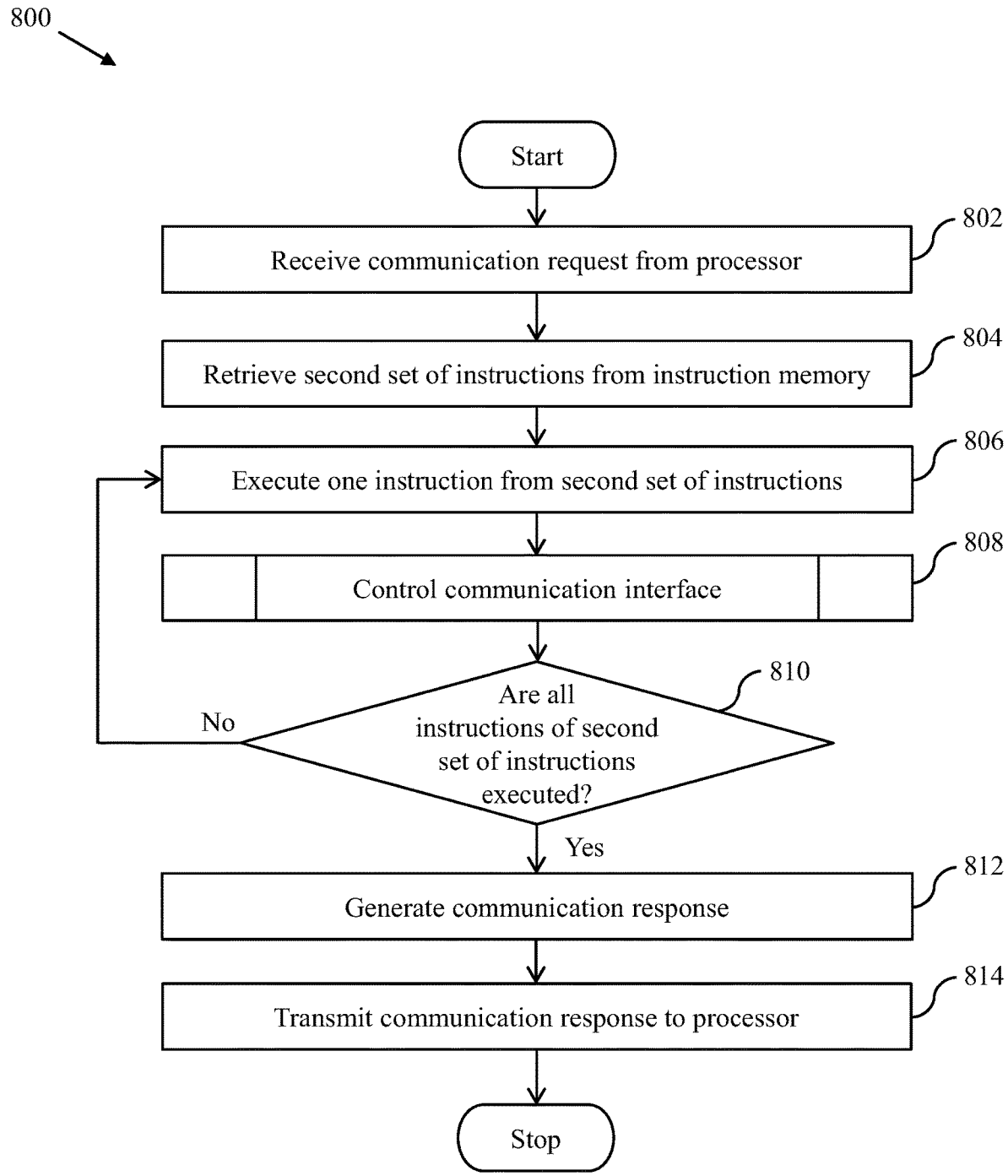
FIGS. 8A-8C, collectively, represent a flow chart that illustrates a method for controlling communication between the first and second devices in accordance with an embodiment of the present invention.
Figure 8B:
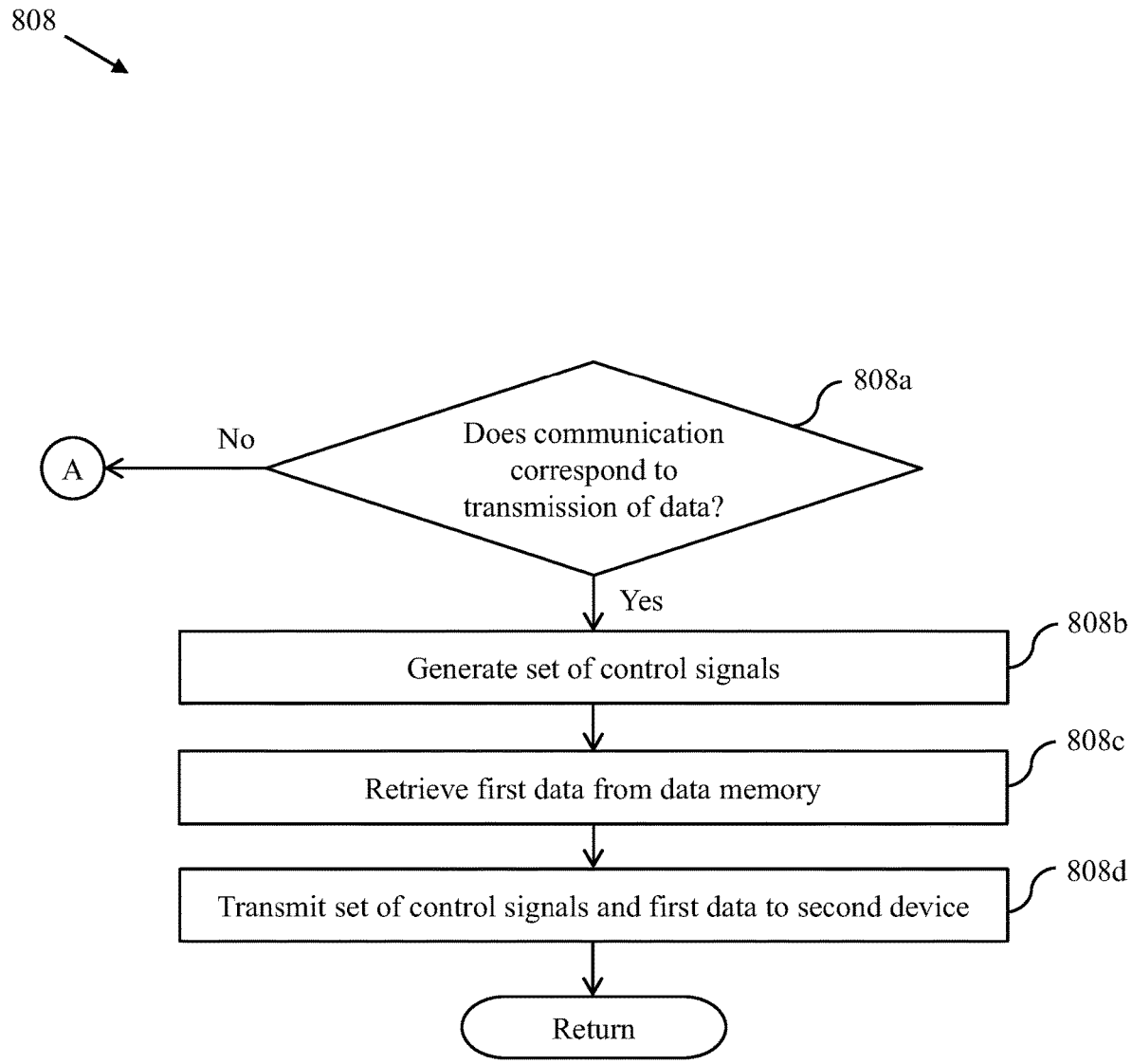
Figure 8C:
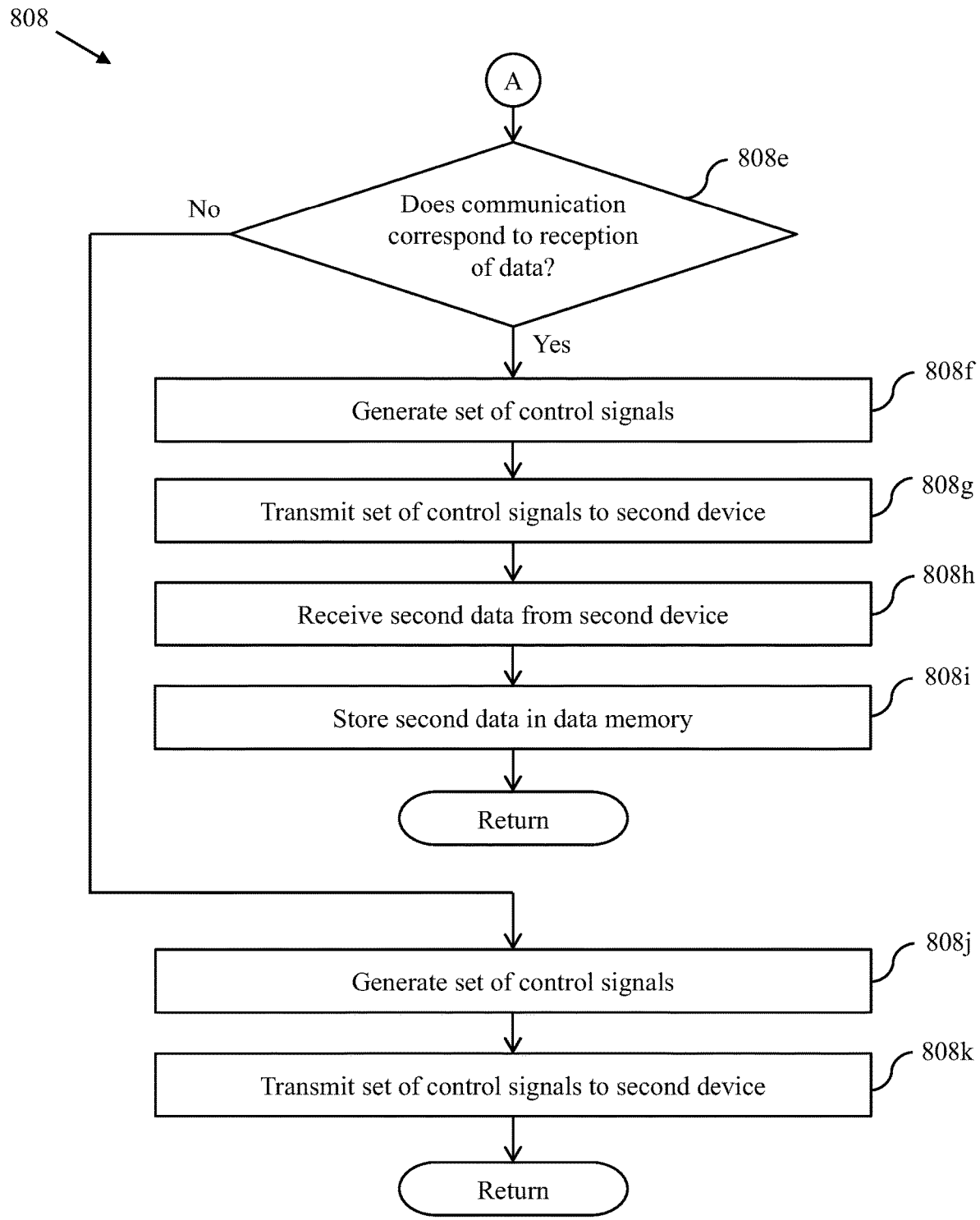

FIGS. 8A-8C, collectively, represent a flow chart 800 that illustrates a method for controlling the communication between the first device 202 and the second device 206 in accordance with an embodiment of the present invention.

Referring now to FIG. 8A, at step 802, the controller 216 receives the communication request from the processor 208. At step 804, the controller 216 retrieves the second set of instructions from the instruction memory 210 based on the communication request.

At step 806, the controller 216 executes one instruction from the second set of instructions. At step 808, the controller 216 controls the communication interface 204 based on the execution of the instruction. The communication interface 204 is controlled at each cycle of the clock signal. Thus, the controller 216 controls the communication between the first device 202 and the second device 206 at each cycle of the clock signal.

Referring now to FIG. 8B, at step 808a, the controller 216 determines whether the communication corresponds to the transmission of data by the first device 202 to the second device 206. If at step 808a, the controller 216 determines that the communication corresponds to the transmission of the data by the first device 202 to the second device 206, step 808b is executed.

At step 808b, the controller 216 generates the set of control signals based on the execution of the instruction. At step 808c, the controller 216 retrieves the first data from the data memory 214. Alternatively, the controller 216 may retrieve the first data from the internal register. At step 808d, the controller 216 transmits the set of control signals and the first data to the second device 206 by way of the first through third control channels 218a-218c and the first data bus 220a, respectively, thereby controlling the communication interface 204, and step 810 is executed.

If at step 808a, the controller 216 determines that the communication does not correspond to the transmission of the data by the first device 202 to the second device 206, step 808e is executed. Referring now to FIG. 8C, at step 808e, the controller 216 determines whether the communication corresponds to the reception of data by the first device 202 from the second device 206. If at step 808e, the controller 216 determines that the communication corresponds to the reception of the data by the first device 202 from the second device 206, step 808f is executed.

At step 808f, the controller 216 generates the set of control signals based on the execution of the instruction. At step 808g, the controller 216 transmits the set of control signals to the second device 206 by way of the first through third control channels 218a-218c. At step 808h, the controller 216 receives the second data from the second device 206 by way of the second data bus 220b. Thus, the communication interface 204 is controlled based on the execution of the instruction. At step 808i, the controller 216 stores the second data in the data memory 214. Alternatively, the controller 216 may store the second data in the internal register. Step 810 is executed after step 808i.

If at step 808e, the controller 216 determines that the communication does not correspond to the reception of the data by the first device 202 from the second device 206, step 808j is executed. At step 808j, the controller 216 generates the set of control signals based on the execution of the instruction. At step 808k, the controller 216 transmits the set of control signals to the second device 206 by way of the first through third control channels 218a-218c, and step 810 is executed.

Referring back to FIG. 8A, at step 810, the controller 216 determines whether all the instructions of the second set of instructions are executed. If at step 810, the controller 216 determines that all the instructions of the second set of instructions are not executed, step 806 is executed. However, if at step 810, the controller 216 determines that all the instructions of the second set of instructions are executed, step 812 is executed.

At step 812, the controller 216 generates the communication response based on the communication between the first device 202 and the second device 206. At step 814, the controller 216 transmits the communication response to the processor 208 in response to the communication request.

As the controller 216 controls the communication interface 204 at each cycle of the clock signal, a need for the processor 208 to control the communication interface 204 is eliminated. Further, the number of processing cycles required by the processor 208 for the communication reduces as the controller 216 generates the set of control signals. Thus, the processor 208 is available for performing various processing operations, i.e., a performance of the processor 208 improves as compared to performance of processors of conventional interface control systems. As a result, a data transfer rate associated with the communication interface 204 increases as compared to data transfer rates associated with communication interfaces of the conventional interface control systems. As the controller 216 directly controls the communication interface 204, latencies in the communication are reduced as compared to latencies introduced by the conventional interface control systems. Further, the controller 216 transmits the set of control signals at each cycle of the clock signal. Thus, the controller 216 controls the communication interface 204 at each cycle of the clock signal. Further, the controller 216 generates the communication request based on the communication protocol associated with the communication interface 204. Thus, the controller 216 is enabled to control the communication interface 204 based on various communication protocols.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A first device for controlling communication with a second device, wherein the first device is connected to the second device by way of a communication interface, the first device comprising:
   a processor that is configured to generate a communication request for communicating with the second device;
   an instruction memory that is configured to store a first set of instructions associated with the first device, wherein the first set of instructions includes: (i) a drive instruction that is associated with transmission of first data and a set of control signals from the first device to the second device, (ii) a freeze instruction that is associated with a retention of a set of logic states of the set of control signals, respectively, (iii) a capture instruction that is associated with a reception of second data by the first device from the second device, and (iv) a wait instruction that is associated with a delay in the transmission of the set of control signals from the first device to the second device; and
   a controller connected to the processor and the instruction memory, wherein the controller is configured to:
      receive, from the processor, the communication request;
      retrieve, based on the communication request, a second set of instructions from the instruction memory;

execute each instruction of the second set of instructions;
generate, based on the execution of each instruction of the second set of instructions, the set of control signals at each cycle of a clock signal associated with the first device; and
transmit the set of control signals to the second device to control the communication between the first and second devices.

2. The first device of claim 1, wherein the communication request is generated based on a communication protocol associated with the communication interface.

3. The first device of claim 1, wherein the communication interface includes a first control channel, a first set of control channels, and one or more data buses.

4. The first device of claim 3, further comprising a data memory that is connected to the controller, and configured to store the first data, wherein when the communication between the first and second devices corresponds to the transmission of the first data from the first device to the second device, the controller is further configured to:
retrieve the first data from the data memory; and
transmit the first data to the second device by way of a data bus of the one or more data buses, wherein the first data is transmitted for at least one cycle of the clock signal.

5. The first device of claim 3, further comprising a data memory that is connected to the controller, wherein when the communication between the first and second devices corresponds to the reception of the second data by the first device from the second device, the controller is further configured to:
receive the second data from the second device by way of a data bus of the one or more data buses, wherein the second data is received for at least one cycle of the clock signal; and
store the received second data in the data memory.

6. The first device of claim 1, wherein the controller is further configured to:
generate a communication response based on the communication between the first and second devices; and
transmit the communication response to the processor in response to the communication request, wherein the communication response is indicative of a status of the communication between the first and second devices.

7. A method for controlling communication between a first device and a second device connected by way of a communication interface, the method comprising:
receiving, by a controller associated with the first device from a processor of the first device, a communication request for communicating with the second device;
retrieving, by the controller from an instruction memory that is associated with the first device and stores a first set of instructions associated with the first device, a second set of instructions based on the communication request, wherein the first set of instructions includes: (i) a drive instruction that is associated with transmission of first data and a set of control signals from the first device to the second device, (ii) a freeze instruction that is associated with a retention of a set of logic states of the set of control signals, respectively, (iii) a capture instruction that is associated with a reception of second data by the first device from the second device, and (iv) a wait instruction that is associated with a delay in the transmission of the set of control signals from the first device to the second device;
executing, by the controller, each instruction of the second set of instructions;
generating, by the controller based on the execution of each instruction of the second set of instructions, the set of control signals at each cycle of a clock signal associated with the first device; and
transmitting, by the controller, the set of control signals to the second device to control the communication between the first and second devices.

8. An interface control system, comprising:
a communication interface; and
first and second devices connected by way of the communication interface, wherein the first device is configured to controls communication with the second device, the first device comprising:
a processor that is configured to generate a communication request for communicating with the second device;
an instruction memory that is configured to store a first set of instructions associated with the first device, wherein the first set of instructions includes: (i) a drive instruction that is associated with transmission of first data and a set of control signals from the first device to the second device, (ii) a freeze instruction that is associated with a retention of a set of logic states of the set of control signals, respectively, (iii) a capture instruction that is associated with a reception of second data by the first device from the second device, and (iv) a wait instruction that is associated with a delay in the transmission of the set of control signals from the first device to the second device; and
a controller connected to the processor and the instruction memory, wherein the controller is configured to:
receive, from the processor, the communication request;
retrieve, based on the communication request, a second set of instructions from the instruction memory;
execute each instruction of the second set of instructions;
generate, based on the execution of each instruction of the second set of instructions, the set of control signals at each cycle of a clock signal associated with the first device; and
transmit the set of control signals to the second device to control the communication between the first and second devices.

9. The first device of claim 3, wherein the controller transmits the set of control signals to the second device by way of the first set of control channels, respectively, wherein the set of control signals includes an enable signal, a valid signal, and a request signal, and wherein:
the enable signal indicates whether the communication interface is enabled for the communication,
the valid signal indicates whether the first data transmitted from the first device to the second device is valid data, and
the request signal is indicative of a request by the first device to receive the second data from the second device.

10. The first device of claim 3, wherein the controller is further configured to receive a status signal from the second device by way of the first control channel, wherein the status signal indicates whether the second device is ready for the communication with the first device, and wherein when the wait instruction is executed, the transmission of at least one of the first data and the set of control signals from the first device to the second device is delayed until the status signal transitions from a first logic state to a second logic state.

11. The first device of claim 10, wherein the controller is further configured to:
generate a set of communication commands, wherein the set of communication commands includes a start command, a read status command, a read data command, a write data command, and an end command, and wherein:
the start command initiates the communication between the first and second devices,
the read status command initiates the reception of the status signal by the first device from the second device,
the read data command initiates the reception of the second data by the first device from the second device,
the write data command initiates the transmission of the first data by the first device to the second device, and
the end command is indicative of a completion of the communication between the first device and the second device; and
transmit the set of communication commands to the second device by way of a data bus of the one or more data buses to further control the communication between the first and second devices.

12. The first device of claim 1, wherein the first set of instructions further includes a flow control instruction that is associated with a control of a flow of instruction execution, and arithmetic and logic instructions that are associated with execution of arithmetic and bitwise operations on the second data, respectively.

13. The method of claim 7, wherein the set of control signals are transmitted to the second device by way of a first set of control channels of the communication interface, respectively, wherein the set of control signals includes an enable signal, a valid signal, and a request signal, and wherein:
the enable signal indicates whether the communication interface is enabled for the communication,
the valid signal indicates whether the first data transmitted from the first device to the second device is valid data, and
the request signal is indicative of a request by the first device to receive the second data from the second device.

14. The method of claim 7, further comprising receiving a status signal from the second device by way of a first control channel of the communication interface, wherein the status signal indicates whether the second device is ready for the communication with the first device, and wherein when the wait instruction is executed, the transmission of at least one of the first data and the set of control signals from the first device to the second device is delayed until the status signal transitions from a first logic state to a second logic state.

15. The method of claim 14, further comprising:
generating, by the controller, a set of communication commands, wherein the set of communication commands includes a start command, a read status command, a read data command, a write data command, and an end command, and wherein:
the start command initiates the communication between the first and second devices,
the read status command initiates the reception of the status signal by the first device from the second device,
the read data command initiates the reception of the second data by the first device from the second device,
the write data command initiates the transmission of the first data by the first device to the second device, and
the end command is indicative of a completion of the communication between the first device and the second device; and
transmitting, by the controller, the set of communication commands to the second device by way of a data bus of the communication interface to further control the communication between the first and second devices.

16. The method of claim 7, wherein the first set of instructions further includes a flow control instruction that is associated with a control of a flow of instruction execution, and arithmetic and logic instructions that are associated with execution of arithmetic and bitwise operations on the second data, respectively.

17. The interface control system of claim 8, wherein the controller transmits the set of control signals to the second device by way of the communication interface, wherein the set of control signals includes an enable signal, a valid signal, and a request signal, and wherein:
the enable signal indicates whether the communication interface is enabled for the communication,
the valid signal indicates whether the first data transmitted from the first device to the second device is valid data, and
the request signal is indicative of a request by the first device to receive the second data from the second device.

18. The interface control system of claim 8, wherein the controller is further configured to receive a status signal from the second device by way of the communication interface, wherein the status signal indicates whether the second device is ready for the communication with the first device, and wherein when the wait instruction is executed, the transmission of at least one of the first data and the set of control signals from the first device to the second device is delayed until the status signal transitions from a first logic state to a second logic state.

19. The interface control system of claim 18, wherein the controller is further configured to:
generate a set of communication commands, wherein the set of communication commands includes a start command, a read status command, a read data command, a write data command, and an end command, and wherein:
the start command initiates the communication between the first and second devices,
the read status command initiates the reception of the status signal by the first device from the second device,
the read data command initiates the reception of the second data by the first device from the second device,
the write data command initiates the transmission of the first data by the first device to the second device, and
the end command is indicative of a completion of the communication between the first device and the second device; and transmit the set of communication commands to the second device by way of the communication interface to further control the communication between the first and second devices.

20. The interface control system of claim 8, wherein the first set of instructions further includes a flow control instruction that is associated with a control of a flow of instruction execution, and arithmetic and logic instructions that are associated with execution of arithmetic and bitwise operations on the second data, respectively.

\* \* \* \* \*